US010345872B1

(12) United States Patent
Chen et al.

(10) Patent No.: US 10,345,872 B1
(45) Date of Patent: Jul. 9, 2019

(54) COMPUTER CASE

(71) Applicants: INVENTEC (PUDONG) TECHNOLOGY CORPORATION, Shanghai (CN); INVENTEC CORPORATION, Taipei (TW)

(72) Inventors: Shih-Wei Chen, Taipei (TW); Yuan-Chang Yang, Taipei (TW); Chih-Wei Chiang, Taipei (TW); Jeng-Ting Pan, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/198,526

(22) Filed: Nov. 21, 2018

(30) Foreign Application Priority Data

Oct. 26, 2018 (CN) .............................. 2018 1 125707

(51) Int. Cl.
    *G06F 1/18* (2006.01)
(52) U.S. Cl.
    CPC .............. *G06F 1/186* (2013.01); *G06F 1/182* (2013.01)
(58) Field of Classification Search
    CPC .................................. G06F 1/186; G06F 1/182
    See application file for complete search history.

(56) References Cited

U.S. PATENT DOCUMENTS

| | | | | |
|---|---|---|---|---|
| 5,679,923 A * | 10/1997 | Le | ............................ | G06F 1/182 174/372 |
| 5,929,376 A * | 7/1999 | Doun | ...................... | G06F 1/184 174/369 |
| 6,058,025 A * | 5/2000 | Ecker | ...................... | G06F 1/184 361/753 |
| 6,201,711 B1 * | 3/2001 | Cherniski | ............... | G06F 1/182 174/359 |
| 6,618,271 B1 * | 9/2003 | Erickson | ................. | G06F 1/182 174/382 |
| 2004/0150972 A1 * | 8/2004 | Chen | ........................ | G06F 1/18 361/800 |
| 2004/0196627 A1 * | 10/2004 | Lohman | .................. | G06F 1/184 361/679.4 |
| 2005/0133236 A1 * | 6/2005 | Megason | ................. | G06F 1/182 174/51 |
| 2009/0260870 A1 * | 10/2009 | Dittus | ..................... | G06F 1/186 174/354 |
| 2011/0285259 A1 * | 11/2011 | Chen | ...................... | G06F 1/186 312/223.2 |

* cited by examiner

*Primary Examiner* — Hung V Ngo
(74) *Attorney, Agent, or Firm* — Maschoff Brennan (57) ABSTRACT

This disclosure relates to a computer case configured to fix an interface card. The computer case includes a main body, a plurality of mount brackets and a framework. The main body includes a first hole and a plurality of second holes. The plurality of second holes are located at a side of the first hole. The plurality of mount brackets are located at the first hole. The framework is conductive. The framework includes a plurality of protrusion portions and a plurality of main portions. The plurality of protrusion portions are connected to the plurality of main portions and are respectively inserted in the plurality of second holes. The framework is disposed on the main body via the plurality of protrusion portions. The plurality of main portions are respectively in contact with the plurality of mount brackets.

10 Claims, 10 Drawing Sheets

COMPUTER CASE

CROSS-REFERENCE TO RELATED APPLICATIONS

This non-provisional application claims priority under 35 U.S.C. § 119(a) on Patent Application No(s). 201811257073.3 filed in China, P.R.C. on Oct. 26, 2018, the entire contents of which are hereby incorporated by reference.

TECHNICAL FIELD

The present disclosure relates to a computer case, more particularly to a computer case having a sheet for reducing electromagnetic interference which the sheet corresponding to a plurality of mount brackets for interface cards.

BACKGROUND

An interface card, such as a PCIe (Peripheral Component Interconnect Express) card, is disposed on a mount bracket of a computer case of a desktop computer. During the operation of the computer, electronic components in the computer may generate electromagnetic interference (EMI) which may generate an adverse effect on the interface card. To prevent this problem, a conductive sheet is disposed on the mount bracket for contacting the interface card and the mount bracket at the same time. Accordingly, the interface card can be electrically connected to the mount bracket via the sheet, and the interface card can be grounded by the sheet and thus reducing the electromagnetic interference on the interface card.

SUMMARY

According to one aspect of the present disclosure, a computer case is configured to fix an interface card. The computer case includes a main body, a plurality of mount brackets and a framework. The main body includes a first hole and a plurality of second holes. The plurality of second holes are located at a side of the first hole. The plurality of mount brackets are located at the first hole. The framework is conductive. The framework includes a plurality of protrusion portions and a plurality of main portions. The plurality of protrusion portions are connected to the plurality of main portions and are respectively inserted in the plurality of second holes. The framework is disposed on the main body via the plurality of protrusion portions. The plurality of main portions are respectively in contact with the plurality of mount brackets.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
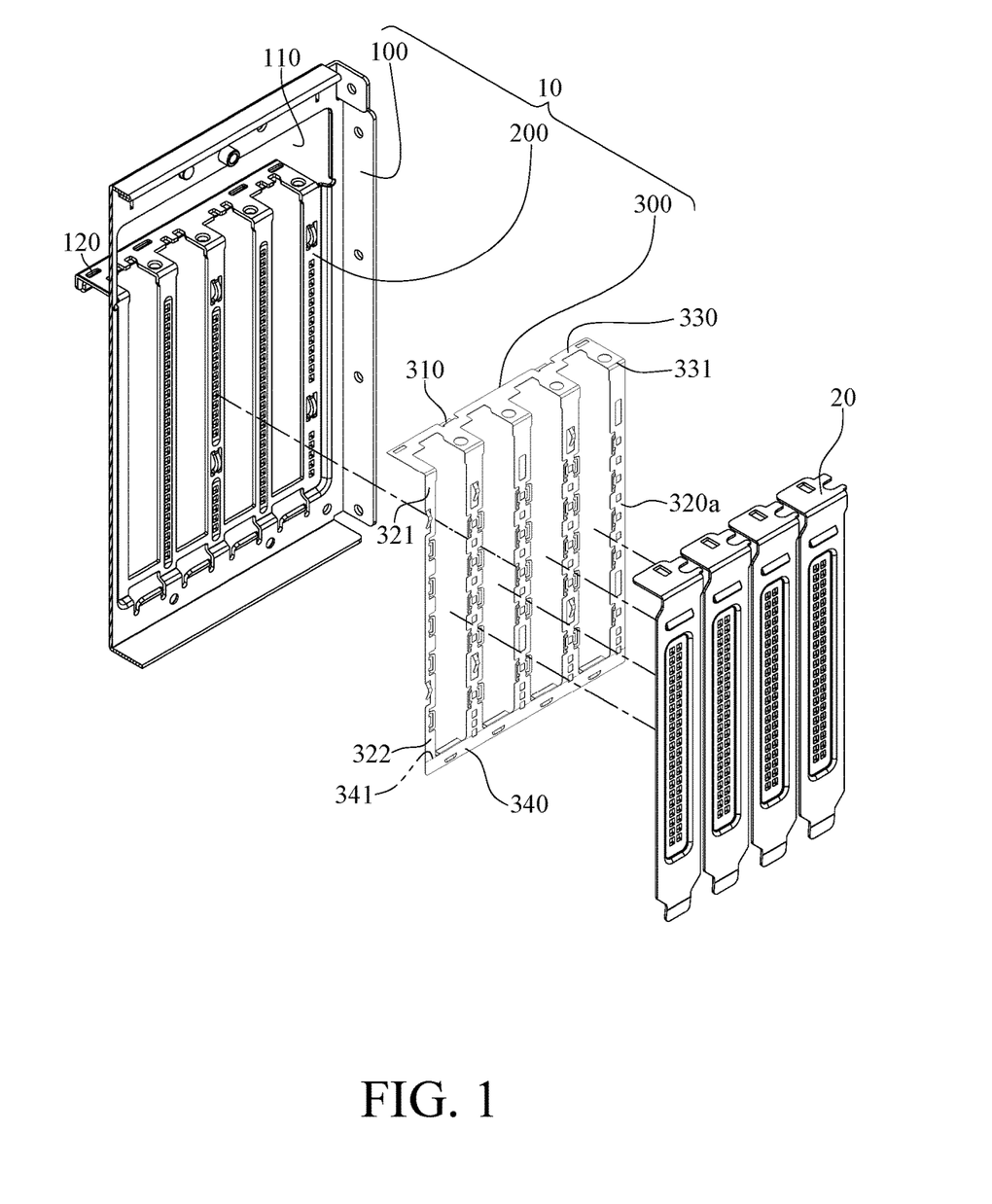
FIG. 1 is an exploded perspective view of a computer case and interface cards according to one embodiment of the present disclosure.
Figure 2:
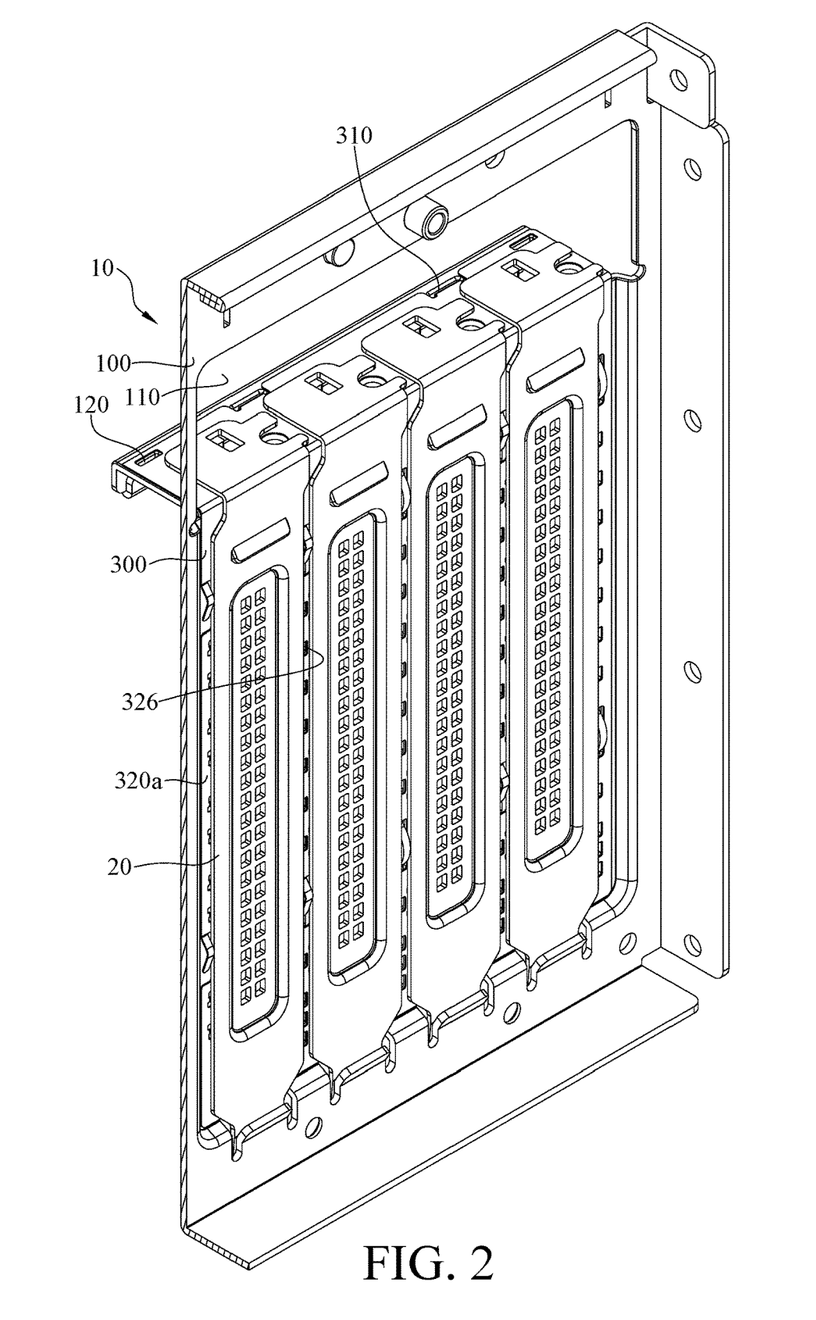
FIG. 2 is a perspective view of an assembly of the computer case and the interface cards in FIG. 1.
Figure 3:
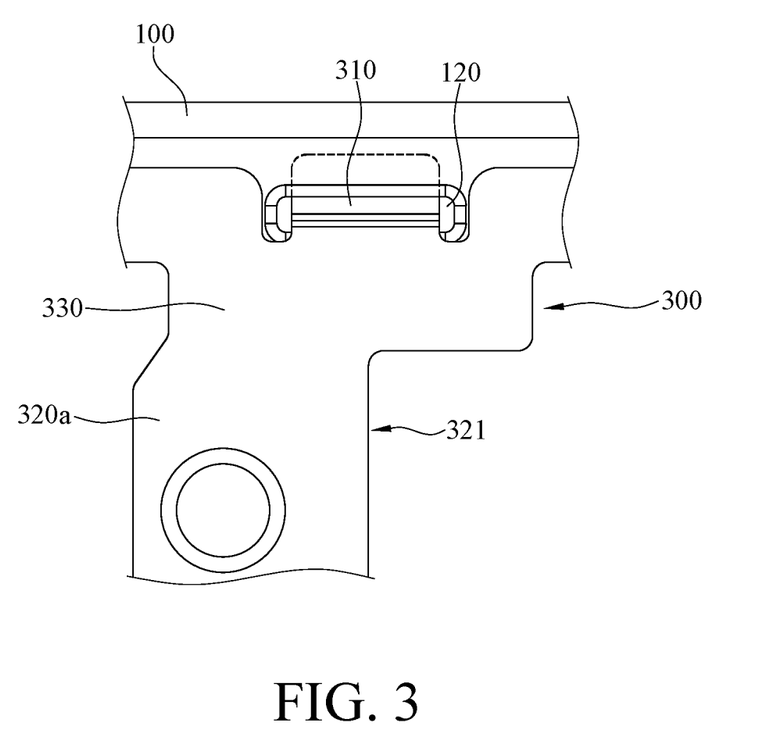
FIG. 3 is a partially enlarged top view of the computer case in FIG. 2.
Figure 4:
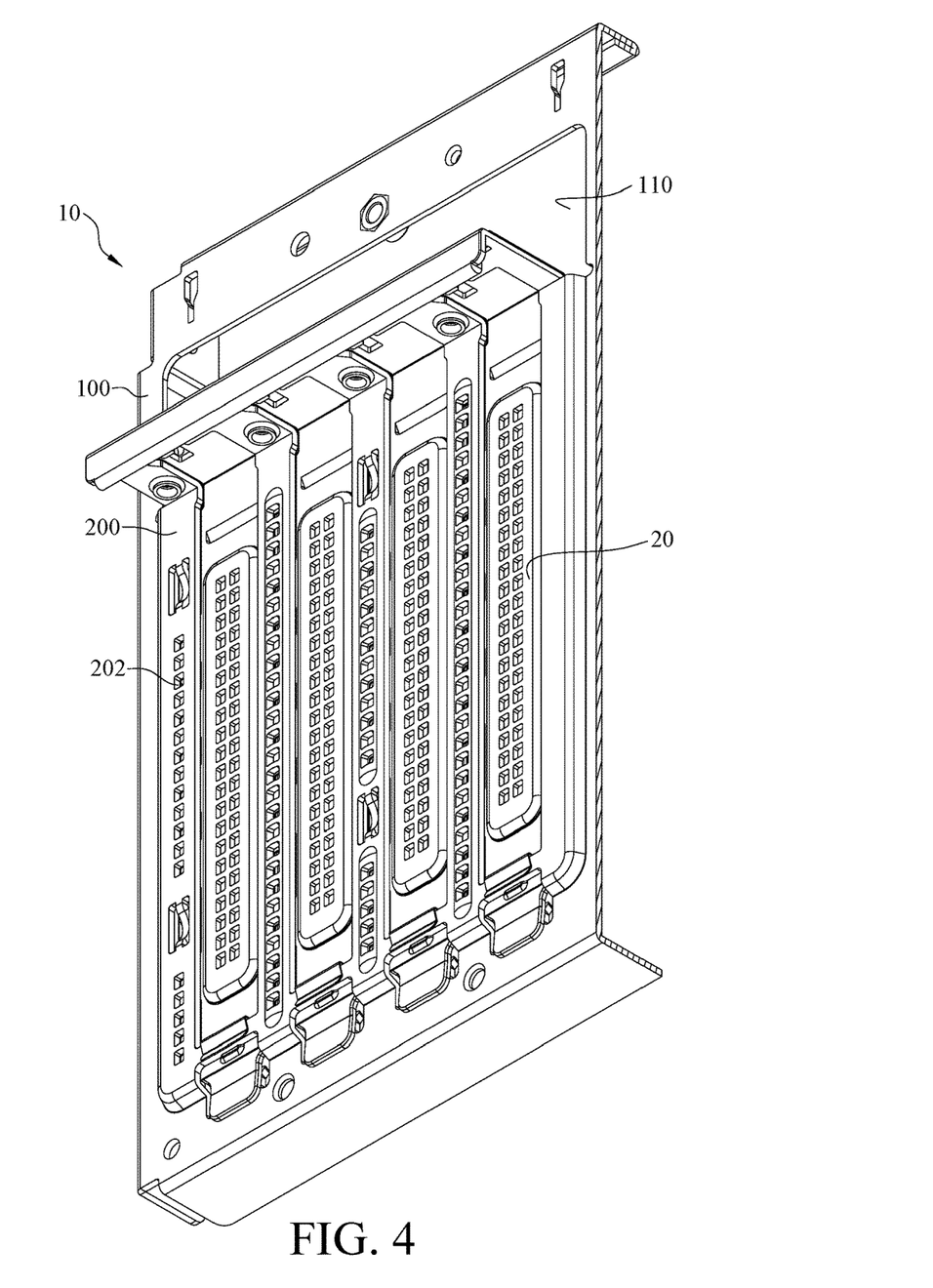
FIG. 4 is another perspective view of the assembly of the computer case and the interface cards in FIG. 1.

Please refer to FIG. 1 to FIG. 4, FIG. 1 is an exploded perspective view of a computer case and interface cards according to one embodiment of the present disclosure, FIG. 2 is a perspective view of an assembly of the computer case and the interface cards in FIG. 1, FIG. 3 is a partially enlarged top view of the computer case in FIG. 2, and FIG. 4 is another perspective view of the assembly of the computer case and the interface cards in FIG. 1.

In this embodiment, the computer case 10 (e.g., a server cabinet) is configured to fix at least one interface card 20 (e.g., a PCIe card). For the simplicity of illustration, only the bracket of the interface card is shown in the drawings; thus, in the disclosure, the bracket is used to represent the interface card 20. The computer case 10 includes a main body 100, a plurality of mount brackets 200 and a framework 300. The main body 100 includes a first hole 110 and a plurality of second holes 120. The plurality of second holes 120 are located at a side of the first hole 110. The mount brackets 200 are located at the first hole 110. The interface card 20 can be disposed on one of the plurality of mount brackets 200 so as to be electrically connected to an electronic component (not shown in the figures), such as a motherboard, inside the computer case 10 and an application (not shown in the figures), such as a printer, outside the computer case 10. As a result, a signal produced from the motherboard can be transmitted to the printer via the interface card 20.

In this embodiment, the framework 300 is conductive and flexible. The framework 300 includes a plurality of protrusion portions 310 and a plurality of main portions 320a. The protrusion portions 310 are connected to each other and are connected to the main portions 320a. The plurality of protrusion portions 310 are respectively inserted into the plurality of second holes 120 so that the framework 300 is able to be disposed on the main body 100. The main portions 320a are respectively in contact with the mount brackets 200. Since the protrusion portions 310 are connected to each other and the main portions 320a are connected to the protrusion portions 310, all of the protrusion portions 310 are allowed to be mounted to the main body 100 in position in one step, and the main portions 320a can be respectively in contact with the mount brackets 200 by doing so.

As discussed above, since the framework 300 includes more than one main portions 320a that are connected via the protrusion portions 310, the framework 300 is larger than a single main portion 320a; thus the framework 300 is easy to be held by hand and is convenient to be installed to the main body 100. Moreover, it only requires to prepare one kind of the framework 300 to install to the main body 100 and doesn't have to consider the width differences among the main portions 320a and the mount brackets 200. As a result, the assembler does not have to spend time on pairing the main portions 320a and the mount brackets 200 and thereby saving assembling time and reducing the error rate. When the framework 300 is mounted on the main body 100, the framework 300 is in contact with the mount brackets 200 and the interface cards 20 at the same time, such that the interface cards 20 can be grounded by the main portions 320a of the framework 300 connecting the mount brackets 200 and thereby reducing the electromagnetic interference.

In this and some embodiments of the present disclosure, the framework 300 further includes a first connecting portion 330 and a second connecting portion 340. Each of the plurality of main portions 320a includes a first end 321 and a second end 322 opposite to each other. A long side 331 of the first connecting portion 330 is connected to the first ends 321, and a long side 341 of the second connecting portion 340 is connected to the second ends 322. The protrusion portions 310 are connected to the first connecting portion 330 and are connected to each other via the first connecting portion 330. The main portions 320a are connected to the protrusion portions 310 via the first connecting portion 330. The first connecting portion 330 and the second connecting portion 340 are able to reinforce the structural strength of the framework 300 so that the framework 300 is not easily deformed, but the disclosure is not limited thereto. In some other embodiments, the framework may not include the first connecting portion; in such a case, the protrusion portions may be directly connected to the main portions and connected to each other via the main portions and the second connecting portion. In some other embodiments, the framework may not include the second connecting portion on a framework; in such a case, the main portions may be connected to the first connecting portion via the first ends, but the second ends may be separated from each other.

Figure 5:
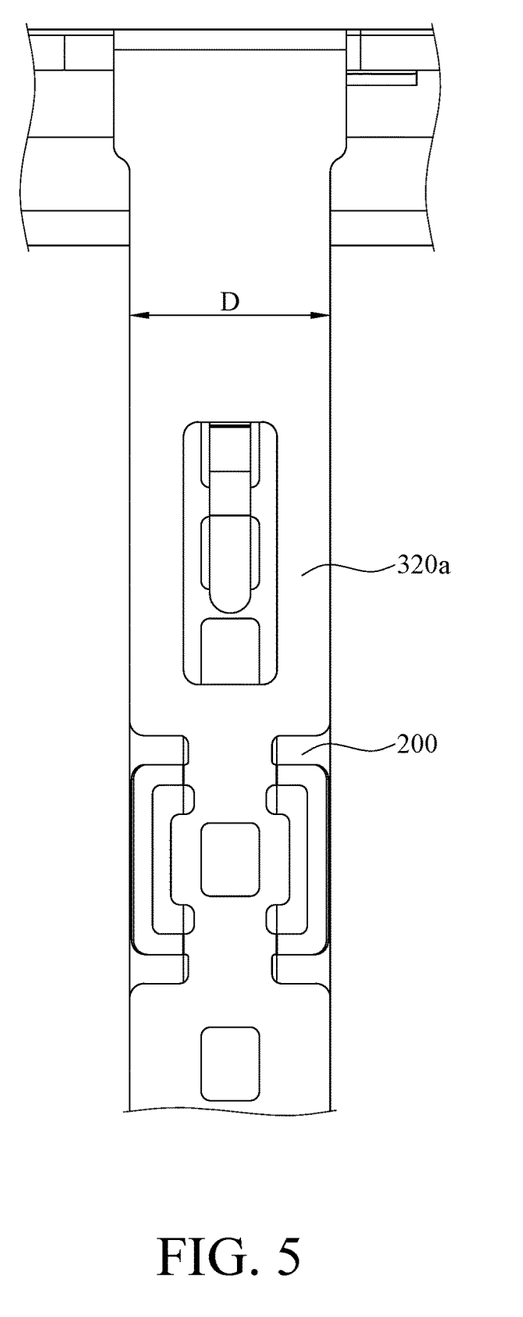
FIG. 5 is a partially enlarged front view of the computer case in FIG. 2.

Please refer to FIG. 5, which is a partially enlarged front view of the computer case in FIG. 2. In this and some embodiments of the present disclosure, the plurality of main portions 320a are respectively in contact with the plurality of mount brackets 200; in addition, in the same direction, the main portion 320a and the mount bracket 200 are substantially the same in width (e.g., the width D in FIG. 5), but the disclosure is not limited thereto.

Figure 6:
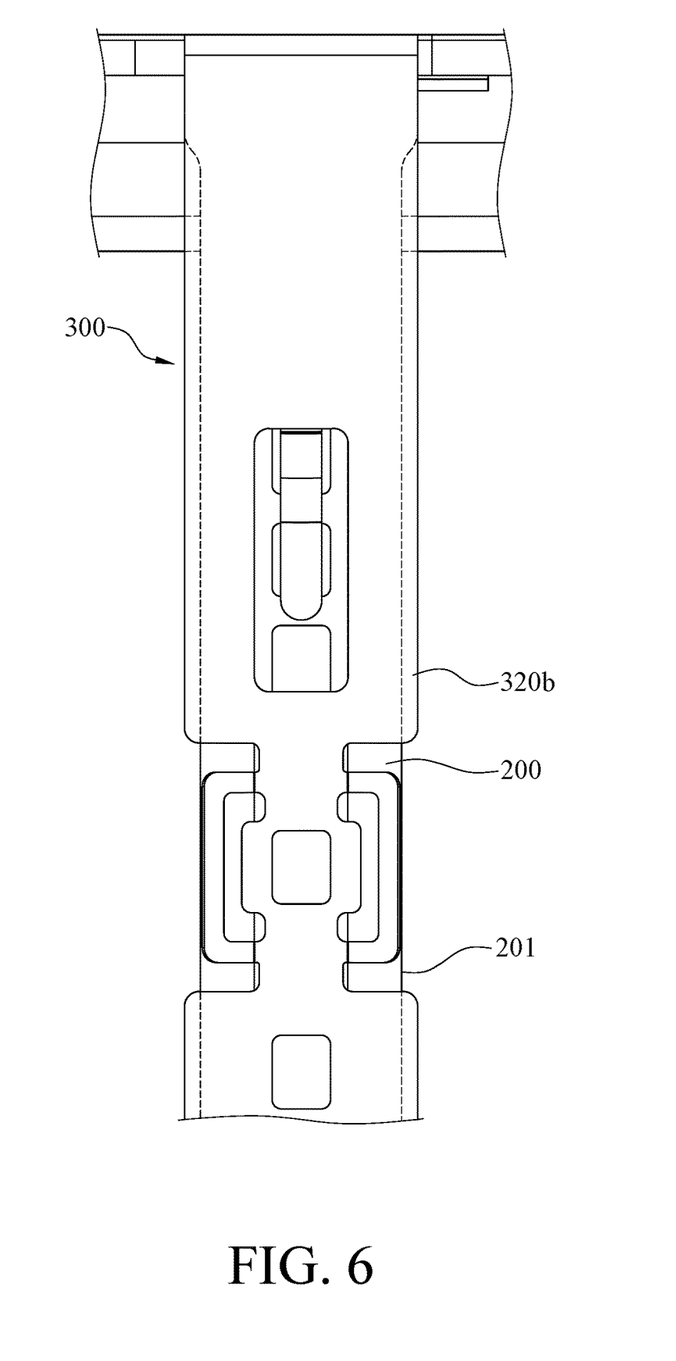
FIG. 6 is a partially enlarged front view of a computer case according to another embodiment of the present disclosure.

Please refer to FIG. 6, which is a partially enlarged front view of a computer case according to another embodiment of the present disclosure. It is noted that only the differences from the preceding embodiments are explained below. In this and some embodiments of the present disclosure, each of a plurality of mount brackets 200 includes a long side 201. In addition, at least one of the main portions 320b covers a portion of one of the long sides 201; in such a case, the main portion 320b is able to contact with a narrower interface card (not shown in the figures). Therefore, the narrower interface card also can be grounded by the main portion 320b connecting the mount bracket 200 so as to reduce the electromagnetic interference. However, the disclosure is not limited by this embodiment. In some other embodiments, the main portion may completely cover one or both of the long sides of the mount bracket, so long as the framework can be easily in contact with the interface card and the mount bracket at the same time.

Figure 7:
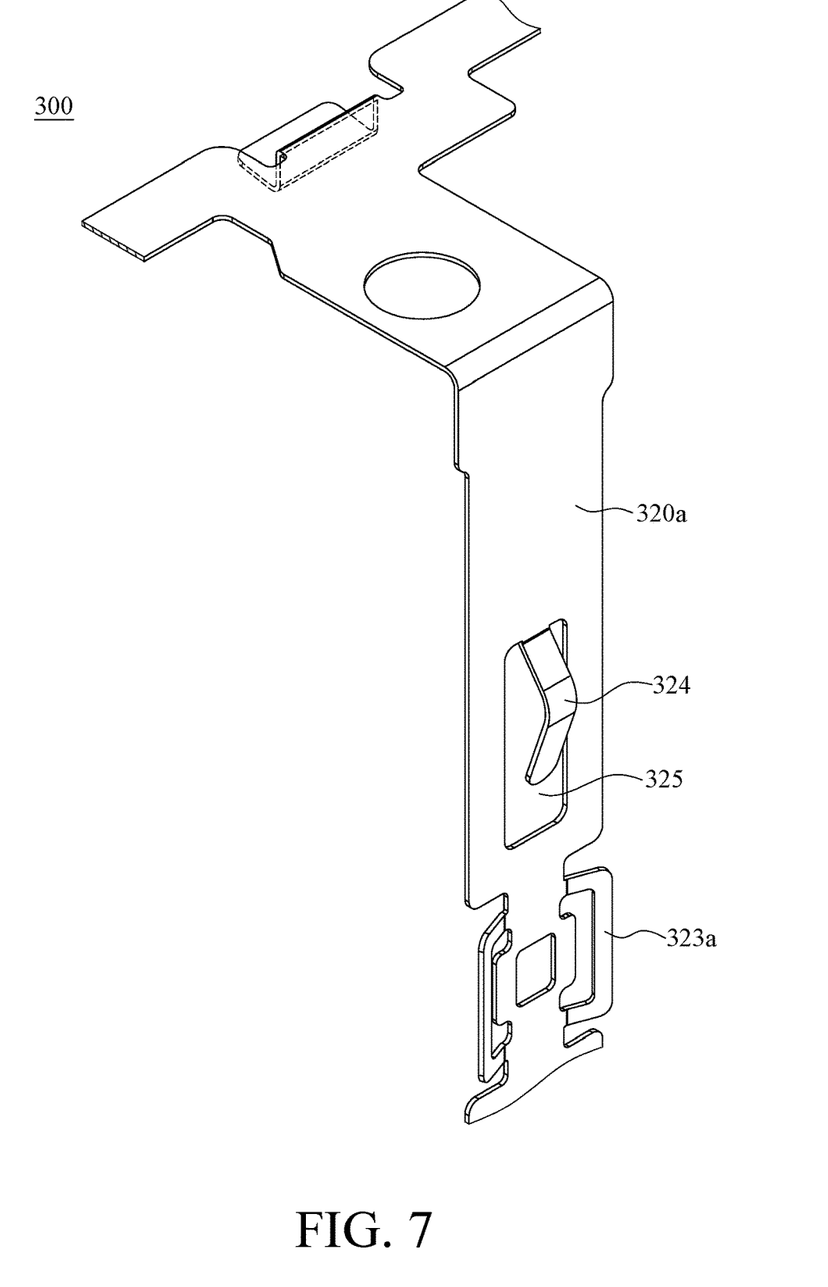
FIG. 7 is a partially enlarged perspective view of a framework of the computer case in FIG. 1.

Please refer to FIG. 7, which is a partially enlarged perspective view of a framework of the computer case in FIG. 1. In this and some embodiments of the present disclosure, each of the plurality of main portions 320a includes conductive parts 323a, but the disclosure is not limited thereto. In some other embodiments, the main portion may include only one conductive part. In this and some embodiments of present disclosure, the conductive parts 323a extend in a direction away from the mount brackets 200 (shown in FIG. 1). That is, the conductive parts 323a and the plurality of main portions 320a are not in the same plane. Accordingly, the main portions 320a are easily in contact with the mount brackets 200 and the interface cards 20 (shown in FIG. 1) at the same time; thus the interface cards 20 can be grounded by the main portions 320a connecting the mount brackets 200, but the disclosure is not limited thereto.

Figure 8:
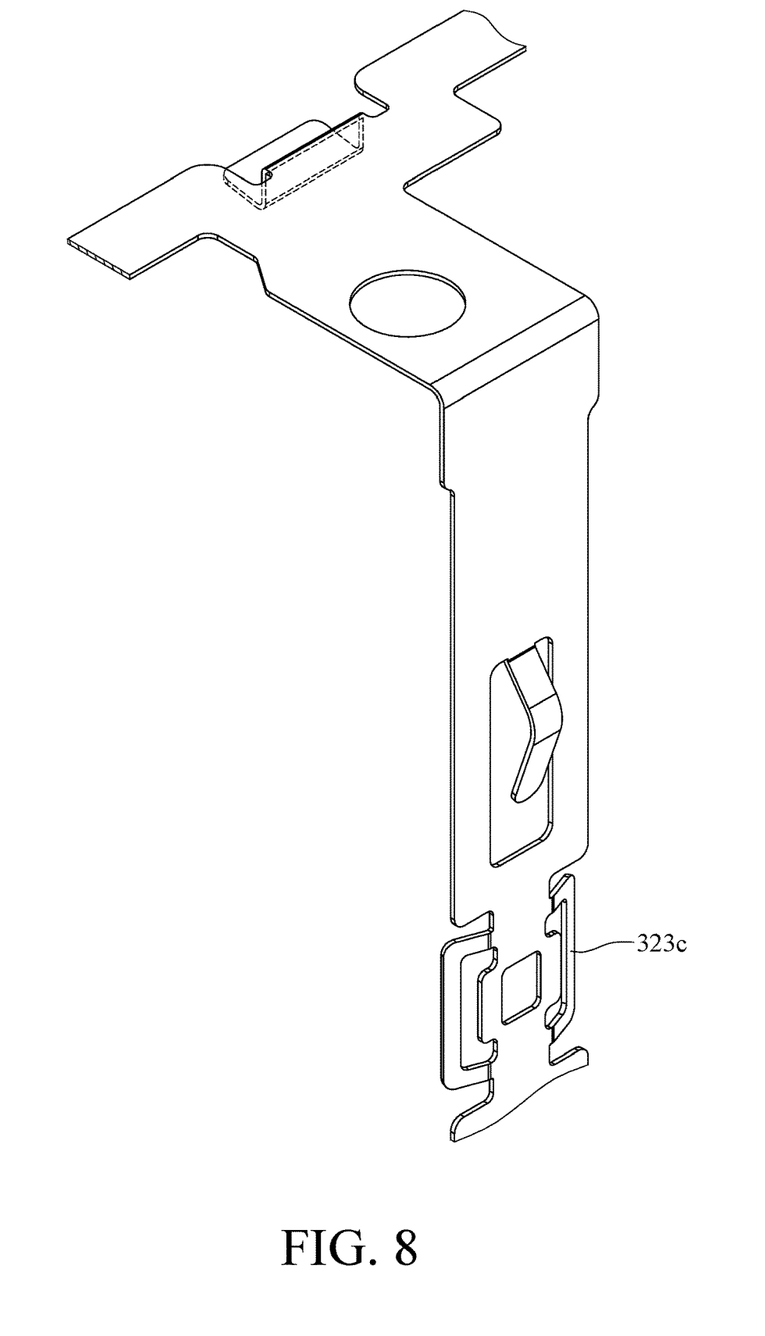
FIG. 8 is a partially enlarged perspective view of a framework of a computer case according to still another embodiment of the present disclosure.

Please refer to FIG. 8, which is a partially enlarged perspective view of a framework of a computer case according to still another embodiment of the present disclosure. It is noted that only the differences from the preceding embodiments are explained below. In this and some embodiments of the present disclosure, conductive parts 323c extend in a direction toward to a mount bracket 200 (shown in FIG. 1), so long as an interface card 20 (shown in FIG. 1) can be grounded by the conductive parts 323c connecting to the mount brackets 200.

Figure 9:
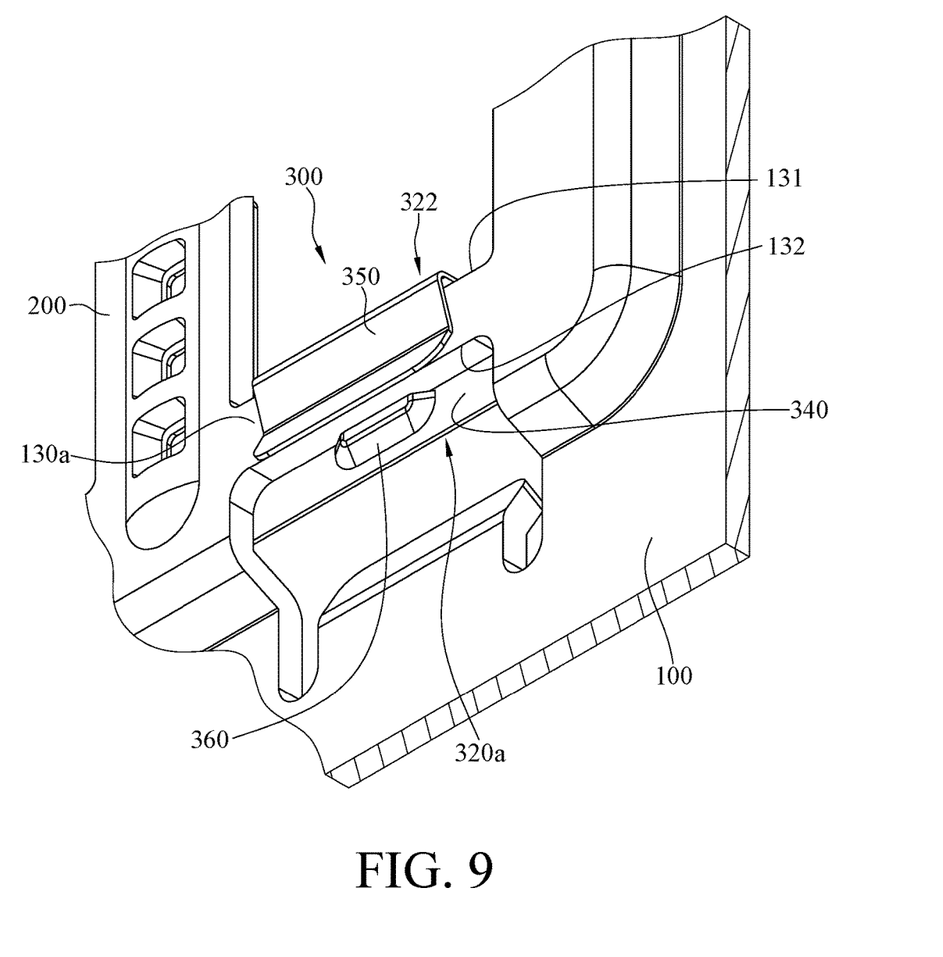
FIG. 9 is a partially enlarged perspective view of the computer case in FIG. 4.

Please refer to FIG. 9, which is a partially enlarged perspective view of the computer case in FIG. 4. In this and some embodiments of the present disclosure, the main body 100 includes bridge portions 130a, but the disclosure is not limited thereto. In some other embodiments, the main body may only include one bridge portion. In this and some embodiments of the present disclosure, each of the bridge portions 130a is located between and connected to two of the mount brackets 200 at the same time. The bridge portions 130a are closer to the second connecting portion 340 than the first connecting portion 330 (shown in FIG. 1) and are respectively located at the second ends 322 of the plurality of main portions 320a. Each of the bridge portions 130a includes a first side 131 and a second side 132. The first side 131 is closer to the plurality of protrusion portions 310 (shown in FIG. 1) than the second side 132. The framework 300 further includes engaging portions 350, but the disclosure is not limited thereto. In some other embodiments, the framework may only include one engaging portion. In this and some embodiments of the present disclosure, the engaging portions 350 are respectively connected to the main portions 320a. The engaging portions 350 and the protrusion portions 310 are respectively located at two opposite sides of the main portions 320a. Installing the framework 300 on the main body 100 may contains two steps. First step is to respectively insert the protrusion portions 310 (shown in FIG. 3) into the second holes 120 (shown in FIG. 3) of the main body 100 so as to fix the first ends 321 (shown in FIG. 3) of the main portions 320a to the mount brackets 200. The second ends 322 are not fixed in position. And then the second step is to slightly deform the framework 300 so as to let the engaging portions 350 to be respectively engaged with the first sides 131 of the bridge portions 130a. As a result, the first ends 321 and the second ends 322 of the main portions 320a are firmly fixed to the mount brackets 200.

However, the bridge portions 130a and the engaging portions 350 are optional, and the present disclosure is not limited thereto. In some other embodiments, the main body may not include the bridge portions, and the framework may not include the engaging portion; in such a case, second ends of main portions may be fixed on the main body by, for example, screwing, adhering or assembling.

Figure 10:
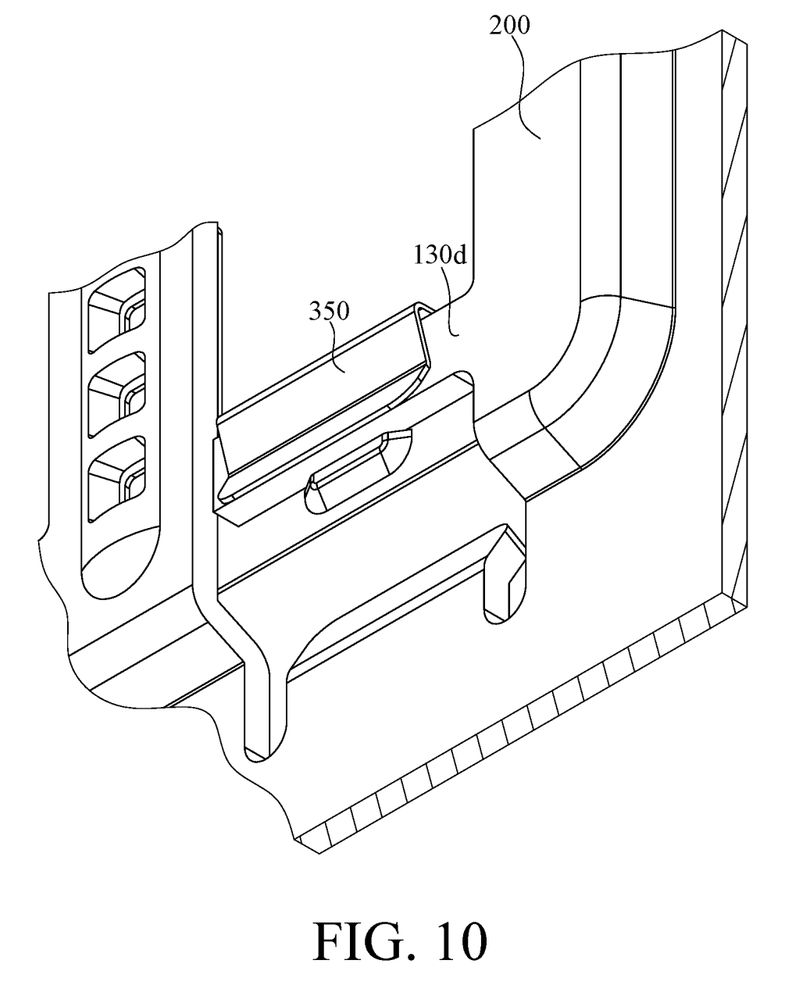
FIG. 10 is a partially enlarged perspective view of a computer case according to yet another embodiment of the present disclosure.

The connection between the bridge portion 130a and two of the mount brackets 200 is not limited by this embodiment. Please refer to FIG. 10, which is a partially enlarged perspective view of a computer case according to yet another embodiment of the present disclosure. It is noted that only the differences from the preceding embodiments are explained below. In this and some embodiments of the present disclosure, each of bridge portions 130d is located between two of mount brackets 200 and is disconnected from one of the adjacent mount brackets 200, so long as the structural strength of the bridge portions 130d is able to support engaging portions 350.

Please refer to FIG. 9, in this and some embodiments of the present disclosure, the framework 300 further includes protrusions 360 pressing against the second sides 132 of the bridge portions 130a when the bridge portions 130a are engaged with the engaging portions 350, thereby strengthening the engagement of the bridge portions 130a and the engaging portions 350. However, the protrusions 360 are optional and the present disclosure is not limited thereto. In some other embodiments, the framework may not include the protrusions; in such a case, only the engaging portions are engaged with the bridge portions.

Please refer to FIG. 7. In this and some embodiments of the present disclosure, the main portion 320a includes guide sheets 324, but the disclosure is not limited thereto. In some other embodiments, the main portion may include only one guide sheet. In this and some embodiments of the present disclosure, the guide sheets 324 extend along a longitudinal direction of the main portion 320a, and a part of the guide sheet 324 protrudes from the main portion 320a. The guide sheets 324 and the main portions 320a may be manufactured by the same process (e.g., a stamping process), such that there is no need to spend time on assembling them. During the installation of the interface card 20 (shown in FIG. 1), the guide sheets 324 may guide the interface card 20 and avoid the interface card 20 to be deformed by the mount bracket 200 due to improper disposing angle.

In this and some embodiments of the present disclosure, the plurality of main portions 320a include third holes 325, but the present disclosure is not limited thereto. In some other embodiments, the main portions may include only one third hole. In this and some embodiments of the present disclosure, the guide sheets 324 are respectively connected to the main portions 320a via a side of the third holes 325 and are respectively located at the third holes 325. In a case of disposing a wider interface card, the guide sheets 324 can be pressed inward to a position without interfering with the interface card 20. The connection between the guide sheet 324 and the main portion 320a is not limited by the embodiment. In some other embodiments, the guide sheets may be respectively connected to the main portions via two opposite sides of the third holes.

Please refer to FIG. 2 and FIG. 4. In this and some embodiments of the present disclosure, each of the main portions 320a includes heat dissipation holes 326, and each of the mount brackets 200 includes heat dissipation holes 202, but the disclosure is not limited thereto. In some other embodiments, each of the main portions may include only one heat dissipation hole; alternatively, each of the mount brackets may include only one heat dissipation hole. In this and some embodiments of present disclosure, the heat dissipation holes 326 of the main portions 320a are completely overlapped with and connected to the heat dissipation holes 202 of the mount brackets 200. As a result, gas is ensured to flow through both inner and outer sides of the computer case 10 via the heat dissipation holes 326 and the heat dissipation holes 202 so as to dissipate heat. The position of the heat dissipation holes 326 and the heat dissipation holes 202 are not limited thereto. In some other embodiments, the heat dissipation holes of the main portions can be respectively partially overlapped with the heat dissipation holes of the mount brackets.

According to the computer case in the embodiments abovementioned, since the protrusion portions are connected to each other and the main portions are connected to the protrusion portions, all of the protrusion portions are allowed to be mounted to the main body in position in one step, and the main portions can be respectively in contact with the mount brackets by doing so. Furthermore, since the framework includes more than one main portions that are connected via the protrusion portions, the framework is larger than a single main portion; thus the framework is easy to be held by hand and is convenient to be installed to the main body. Moreover, it only requires to prepare one kind of the framework to install to the main body and doesn't have to consider the width differences among the main portions and the mount brackets. As a result, the assembler does not have to spend time on pairing the main portions and the mount brackets and thereby saving assembling time and reducing the error rate. When the framework is mounted on the main body, the framework is in contact with the mount brackets and the interface cards at the same time, such that the interface cards can be grounded by the main portions of the framework connecting the mount brackets and thereby reducing the electromagnetic interference.

In some other embodiments, the framework further includes a first connecting portion and a second connecting portion. The first connecting portion and the second connecting portion are able to reinforce the structural strength of the framework so that the framework is not easily deformed.

In some other embodiments, each of a plurality of mount brackets further includes a long side. In addition, at least one of the main portions covers a portion of one of the long sides; in such a case, the main portion is able to contact with a narrower interface card. Therefore, the narrower interface card also can be grounded by the main portion connecting the mount bracket so as to reduce the electromagnetic interference.

In some other embodiments, each of the plurality of main portions further includes conductive parts. The main portions are easily in contact with the mount brackets and the interface cards at the same time; thus the interface cards can be grounded by the main portions connecting the mount brackets.

In some other embodiments, the main body further includes bridge portions, and the framework further includes engaging portions. The engaging portions of the framework are respectively engaged with the first sides of the bridge portions. As a result, the first ends and the second ends of the main portions are firmly fixed to the mount brackets.

In some other embodiments, the framework further includes protrusions pressing against the second sides of the bridge portions when the bridge portions are engaged with the engaging portions, thereby strengthening the engagement of the bridge portions and the engaging portions.

In some other embodiments, the plurality of main portions further include guide sheets. The guide sheets extend along a longitudinal direction of the plurality of main portions, and a part of the guide sheets protrudes from the main portion. The guide sheets and the main portions may be manufactured by the same process, such that there is no need to spend time on assembling them. During the installation of the interface card, the guide sheets may guide the interface card and avoid the interface card to be deformed by the mount bracket due to improper disposing angle.

In some embodiment, the plurality of main portions further include third holes. The guide sheets are respectively connected to the main portions via a side of the third holes and are respectively located at the third holes. In a case of disposing a wider interface card, the guide sheets can be pressed inward to a position without interfering with the interface card.

In some other embodiments, each of the plurality of main portions further includes heat dissipation holes, and each of the plurality of mount brackets includes heat dissipation holes. The heat dissipation holes of the main portions are completely overlapped with and connected to the heat dissipation holes of the mount brackets. As a result, gas is ensured to flow through both inner and outer sides of the computer case via the heat dissipation holes and the heat dissipation holes so as to dissipate heat.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A computer case, configured to fix an interface card, comprising:
   a main body, including a first hole and a plurality of second holes, wherein the plurality of second holes are located at a side of the first hole;
   a plurality of mount brackets, located at the first hole; and
   a framework, wherein the framework is conductive, the framework comprises a plurality of protrusion portions and a plurality of main portions, the plurality of protrusion portions are connected to the plurality of main portions and respectively inserted in the plurality of second holes, the framework is disposed on the main body via the plurality of protrusion portions, and the plurality of main portions are respectively in contact with the plurality of mount brackets.

2. The computer case according to claim 1, wherein the framework further comprises a first connecting portion and a second connecting portion, each of the plurality of main portions includes a first end and a second end opposite to each other, a long side of the first connecting portion is connected to the first ends, a long side of the second connecting portion is connected to the second ends, the plurality of protrusion portions are connected to the first connecting portion and are connected to each other via the first connecting portion, and the plurality of main portions are connected to the plurality of protrusion portions via the first connecting portion.

3. The computer case according to claim 1, wherein each of the plurality of mount brackets includes a long side, and the plurality of main portions cover a portion of the long side of one of the plurality of mount brackets.

4. The computer case according to claim 1, wherein each of the plurality of main portions comprises a conductive part extending toward or away from the plurality of mount brackets.

5. The computer case according to claim 1, wherein the plurality of mount brackets are configured to electrically connect to the interface card via the plurality of main portions.

6. The computer case according to claim 1, wherein the main body comprises a bridge portion connected to a side of the plurality of mount brackets, the bridge portion includes a first side and a second side, the first side is closer to the plurality of protrusion portions than the second side, the framework further comprises an engaging portion connected to one of the plurality of main portions, the engaging portion and the plurality of protrusion portions are located at two opposite sides of the plurality of main portions, and the engaging portion is mounted on the first side of the bridge portion.

7. The computer case according to claim 6, wherein the framework further comprises a protrusion in contact with the second side of the bridge portion.

8. The computer case according to claim 1, wherein one of the plurality of main portions comprises a guide sheet, and a part of the guide sheet is far away from the plurality of main portions.

9. The computer case according to claim 8, wherein one of the plurality of main portions include a third hole, and the guide sheet is connected to the plurality of main portions via a side of the third hole and located at the third hole.

10. The computer case according to claim 1, wherein one of the plurality of main portions includes a heat dissipation hole, one of the plurality of mount brackets includes a heat dissipation hole, and the heat dissipation hole of one of the plurality of main portions is connected to the heat dissipation hole of one of the plurality of mount brackets.

* * * * *